# 2,725,327

PESTICIDAL COMPOSITION CONTAINING 2-P-DIOXANETHIOL S - (O,O - DIALKYLPHOSPHORODITHIOATE)

William R. Diveley, Newark, Del., assignor to Hercules Powder Company, Wilmington, Del., a corporation of Delaware No Drawing. Application August 30, 1954,
Serial No. 453,136

13 Claims. (Cl. 167—33)

This invention relates to new and useful organic dithiophosphate compounds and to pesticidal compositions containing the same.

The novel organic dithiophosphate compounds of this invention have the general formula

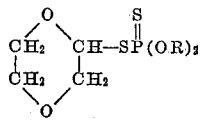

in which each R represents a lower alkyl radical.

These organic dithiophosphate compounds have pesticidal properties and distinguish themselves in being highly toxic at low concentrations toward certain pests.

The organic dithiophosphate compounds of this invention are made by reacting p-dioxene, or 2-halo-p-dioxane with the desired ester of dithiophosphoric acid, the latter being the product of reaction of a lower aliphatic alcohol or a mixture of lower aliphatic alcohols of the formula ROH and $P_2S_5$. The ester of dithiophosphoric acid may be reacted directly with the p-dioxene or 2-halo-p-dioxane, or it may be reacted with 2-halo-p-dioxane in the form of its salt or in the presence of materials which sequester the hydrogen halide set free in the reaction.

The methods of making the products of this invention and methods of using the products as pesticides are more particularly described in the following examples in which all parts and percentages are by weight.

Example 1

A solution of 0.02 part hydroquinone, 50 parts benzene, and 20.5 parts O,O-diethyl dithiophosphoric acid was heated at 50° C., and 8.6 parts p-dioxene was added over a 10 minute period. A mildly exothermic reaction occurred. The temperature was maintained at 50–60° C. for 2 hours. After cooling the mixture to room temperature, 100 parts water and 50 parts ether were added, and the resultant mixture was neutralized with 1 N potassium hydroxide solution. The organic layer was separated, washed neutral with water, dried over anhydrous sodium sulfate, stripped of solvent under reduced pressure and topped at 60° C. at 0.5 mm. pressure. The residue, taken as product, was the diethyl dithiophosphate of p-dioxane-2-thiol, also designated 2-p-dioxanethiol S-(O,O-diethyl phosphorodithioate), amounted to 21.4 parts and had the following analysis: S, 23.9%; P, 12.2% $n_D^{20}$=1,5232; (calcd. for the designated ester) S, 23.6%; P, 11.4%.

An emulsifiable concentrate of the residue was made by mixing 1 gram of the residue with 1 ml. benzene and 1 ml. sorbitan monolaurate polyoxyalkylene derivative (Tween 20). This concentrate was then diluted with water to form dispersions of the residue in water varying in concentration from 1.0% to 0.001%. The dispersions were then tested for their toxicity to caged insects and to mites. Standard test methods were used for obtaining the results set forth below.

Leaves of lima bean seedlings infested with two-spotted mites were sprayed with dispersions containing 0.025% and 0.005% of the residue. After 5 days were was 97% mortality at 0.025% concentration and 72% mortality at 0.005% concentration.

When pea aphids were sprayed with 0.1% emulsion of the compound of this example and placed on pea plants sprayed simultaneously with the same emulsion, an 80% kill of the aphids in 48 hours was obtained.

Example 2

O,O-diisopropyl dithiophosphoric acid was produced by adding isopropyl alcohol to phosphorus pentasulfide ($P_2S_5$) while heating under reflux in benzene solution and venting the hydrogen sulfide evolved. The temperature was gradually raised during the course of addition of the isopropyl alcohol, and the reaction was stopped when hydrogen sulfide evolution ceased. The product was cooled and filtered.

To a solution of 23.8 parts of O,O-diisopropyl dithiophosphoric acid and 0.02 part hydroquinone in 50 parts benzene was added 8.6 parts p-dioxene over a 10 minute period while heating at 50–60° C. and heating was continued for 2 hours. The resulting product was washed with water and then with dilute alkali and then dried over sodium sulfate. After removal of the benzene by distillation, a residue of diisopropyl dithiophosphate of p-dioxane-2-dithiol amounting to about 23.1 parts was isolated. This residue had the following analysis: P, 11.0%; S, 21.1%; (calcd. for $C_{16}H_{34}O_6P_2S_4$) P, 10.3%; S, 21.3%.

It was made into an emulsifiable concentrate by mixing 1 gram of the residue with 1 ml. benzene and 1 ml. sorbitan monolaurate polyoxyalkylene derivative (Tween 20). This concentrate was then diluted with water to form dispersions of the residue in water of concentrations from 1% to 0.01%. These dispersions were tested for their contact toxicity to pea aphids and two-spotted spider mites as in Example 1. The results showed 80% kill of two-spotted spider mites and 80% kill of pea aphids at 0.1% concentration.

Example 3

Di-n-propyl dithiophosphoric acid was prepared by the reaction of n-propyl alcohol on phosphorus pentasulfide and it was then reacted with p-dioxene in benzene solution to produce the di-n-propyl dithiophosphate of p-dioxane-2-thiol. This product was then made into a concentrate with benzene and Tween 20 and diluted to emulsions of various concentrations. These emulsions were shown to have high toxicity to insects and mites both by contact and by treating plants on which the insects and mites normally live. The results showed a 90% kill of two-spotted spider mites and an 80% kill of pea aphids at 0.1% concentration.

Example 4

Di-sec-butyl dithiophosphoric acid was prepared by the reaction of sec-butyl alcohol on phosphorus pentasulfide and was then reacted with p-dioxene in benzene solution to produce the di-sec-butyl dithiophosphate of p-dioxane-2-thiol. This product was then made into a concentrate with benzene and Tween 20 and diluted to emulsions of various concentrations. These emulsions were then tested for their toxicity to insects and mites both by contact and by treating plants on which the insects and mites normally live. The results showed an 80% kill of two-spotted spider mites and a 50% kill of pea aphids at 0.1% concentration.

Example 5

Dimethyl dithiophosphoric acid was prepared by the reaction of methyl alcohol on phophorus pentasulfide and was then reacted with p-dioxene in benzene solution to produce the dimethyl dithiophosphate of p-dioxane-2-thiol. This product was then made into a concentrate with benzene and Tween 20 and diluted to emulsions of various concentrations. These emulsions were then shown to have high toxicity to insects and mites both by contact and by treating plants on which the insects and mites normally live. The results showed a 90% kill of two-spotted spider mites at 0.1% concentration.

The organic dithiophosphate compounds of the formula

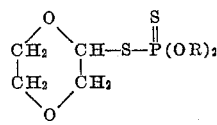

are those in which each R is the same or a different lower alkyl radical: methyl, ethyl, n-propyl, isopropyl, isobutyl, sec-butyl or n-butyl. In the above definition of the scope of the compounds of this invention, "lower alkyl" is defined to include those alkyl radicals with 1–4 carbon atoms.

The organic dithiophosphate compounds of this invention are produced by reacting the secondary dithiophosphate ester of the aliphatic alcohols with p-dioxene or with 2-halo-p-dioxane.

In producing the organic dithiophosphate compounds of this invention by the reaction of the secondary ester of dithiophosphoric acid with p-dioxene, the secondary ester of dithiophosphoric acid is contacted with dioxene preferably at a temperature in the range of about 20° C. to about 200° C. until the secondary ester of dithiophosphoric acid has combined with the p-dioxene. The reaction is slightly exothermic. The temperature of reaction and time of reaction selected are such that neither the reactants nor the products undergo decomposition. The reaction may be carried out in a small amount of a solvent such as benzene, toluene, xylene, cyclohexane, hexane, acetone, carbon tetrachloride, chloroform, anhydrous alcohols, or dioxane. For best yields based on the p-dioxene, an excess of the secondary ester of dithiophosphoric acid is preferably used. The excess of the secondary ester is readily removed from the product by washing the product with water containing a little alkali. The condensation of the secondary ester of dithiophosphoric acid with p-dioxene does not require a catalyst and is effected readily in non-aqueous reaction medium. The condensation is preferably carried out in the absence of water.

In producing the compounds of this invention the reaction between the 2-halo-p-dioxane and the secondary esters of dithiophosphoric acid or their salts is carried out by heating the two reactants at a temperature at which reaction takes place but below the decomposition temperature of the reactants and products in the range of 20° to 200° C., preferably in the range of 30° to 110° C. In order to get complete reaction it is preferable to use an excess over the theoretical amount of the ester of the dithiophosphoric acid. When the reaction is complete, the excess ester of the dithiophosphoric acid is readily removed by washing with water containing sufficient alkali to produce the water-soluble salt.

The reaction is preferably carried out in nonaqueous media, and organic solvents such as those listed for the process using p-dioxene may be used to aid in control of the reaction. It is preferable to use hydrocarbon solvents when using an amine salt of the dithiophosphoric acid ester or when using an amine or ammonia as a sequestering reagent.

When the diester of dithiophosphoric acid is used as the free acid in the reaction with the 2-halo-p-dioxane, hydrogen halide which is liberated is preferably sequestered by adding a material to combine with the hydrogen halide as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the 2-halo-p-dioxane. Amines which can be used include pyridine, tertiary alkyl amines such as trimethyl amine, tributyl amine, triamyl amine, dimethyl aniline and the like. Inorganic bases may also be used. These include ammonia, alkali metal hydroxides, carbonates nad bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the 2-halodioxane, the alkaline material is preferably added gradually as needed but it can be added all at once if desired. Ammonia is suitably added gradually as a gas, the solids are suitably added in finely divided form.

The secondary esters of thiophosphoric acid are produced by reacting a lower aliphatic alcohol or a mixture of lower aliphatic alcohols, which is to form a part of the ester, with $P_2S_5$ preferably in a nonreactive solvent such as benzene, toluene, xylene, hexane or cyclohexane and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the 2-chloro-p-dioxane or the p-dioxene.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum, and the like in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface active dispersing agent and water as the essential ingredients. The amount of the compounds of this invention in the aqueous dispersions when diluted for spraying of plants will be in the range of about 10 to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface active dispersing agent. The concentrate may also contain small amounts of organic solvents to aid in effective dispersion. The amount of surface active dispersing agent used is usually at least 5% of the amount of toxic compound in the concentrate.

Suitable surface-active dispersing agents for use in the compositions of this invention are those disclosed in Chemistry of Insecticides, Fungicides, and Herbicides (l. c., pages 280–287) for use with known insecticides and include neutral soaps of resin, alginic and fatty acids and alkali metals or alkyl amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface active dispersing agents which are useful in the compositions of this invention are the omega-substituted polyethylene glycols of relatively long chain length, particularly those in which the omega substituent is aryl, alkyl, or acyl. Compositions of the toxic material and surface active dispersing agent will in some instances have more than one surface active dispersing agent for a particular type of utility, or in addition to a surface active dispersing agent, hydrocarbons such as kerosene and mineral oil will also be added as improvers. Thus, the toxic material may contain a clay as the sole adjuvant or clay and hydrocarbon, or clay and another surface active dispersing agent to augment the the dispersing action of the clay. Likewise, the toxic material may have water admixed therewith along with the surface active dispersing agent, sufficient generally being used to form an emulsion. All of these compositions of toxic material and surface active dispersing agent may contain in addition synergists and/or adhesive or sticking agents.

What I claim and desire to protect by Letters Patent is:

1. As a new composition of matter a compound of the formula

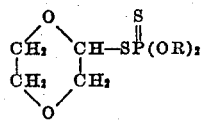

in which each R represents a lower alkyl radical.

2. As a new composition of matter a compound of the formula

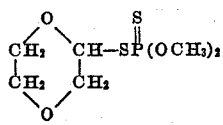

3. As a new composition of matter a compound of the formula

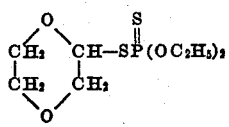

4. As a new composition of matter a compound of the formula

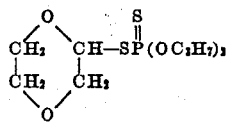

5. As a new composition of matter a compound of the formula

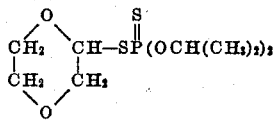

6. As a new composition of matter a compound of the formula

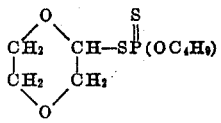

7. A pesticidal composition comprising the compound of claim 1 and an insecticidal adjuvant.
8. A pesticidal composition comprising the compound of claim 2 and an insecticidal adjuvant.
9. A pesticidal composition comprising the compound of claim 3 and an insecticidal adjuvant.
10. A pesticidal composition comprising the compound of claim 4 and an insecticidal adjuvant.
11. A pesticidal composition comprising the compound of claim 5 and an insecticidal adjuvant.
12. A pesticidal composition comprising the compound of claim 6 and an insecticidal adjuvant.
13. The method of producing a compound of the formula

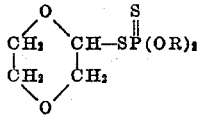

which comprises reacting a secondary ester of dithiophosphoric acid of the formula

in which R is a lower alkyl radical, with p-dioxene.

References Cited in the file of this patent

UNITED STATES PATENTS

| | | |
|---|---|---|
| 2,529,304 | Mikeska | Nov. 7, 1950 |
| 2,531,129 | Hook | Nov. 21, 1950 |
| 2,542,604 | Weisel | Feb. 20, 1951 |
| 2,565,920 | Hook | Aug. 28, 1951 |
| 2,565,921 | Hook | Aug. 28, 1951 |